United States Patent
Tanaka et al.

(10) Patent No.: US 8,350,426 B2
(45) Date of Patent: Jan. 8, 2013

(54) AUTOMOTIVE ROTARY ELECTRIC MACHINE

(75) Inventors: Kazunori Tanaka, Chiyoda-ku (JP); Kyoko Higashino, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 20 days.

(21) Appl. No.: 13/179,226

(22) Filed: Jul. 8, 2011

(65) Prior Publication Data
US 2012/0205993 A1   Aug. 16, 2012

(30) Foreign Application Priority Data

Feb. 16, 2011 (JP) ................................. 2011-031067

(51) Int. Cl.
*H05K 5/00* (2006.01)
(52) U.S. Cl. .............. 310/68 D; 310/89; 310/43; 310/71
(58) Field of Classification Search .................... 310/43, 310/68 D, 71, 89; *H05K 5/00*
See application file for complete search history.

(56) References Cited

U.S. PATENT DOCUMENTS

| 6,034,452 A * | 3/2000 | Nakamura et al. | 310/68 D |
| 7,973,438 B2 * | 7/2011 | Mashino | 310/68 D |
| 2005/0151435 A1 * | 7/2005 | Misaki | 310/89 |
| 2006/0181167 A1 * | 8/2006 | Bradfield et al. | 310/89 |

FOREIGN PATENT DOCUMENTS

JP        10-79580 A      3/1998

* cited by examiner

*Primary Examiner* — Quyen Leung
*Assistant Examiner* — Naishadh Desai
(74) *Attorney, Agent, or Firm* — Sughrue Mion, PLLC

(57) ABSTRACT

A voltage regulator negative electrode terminal is mounted to an axially outer end surface of a rear bracket so as to be in a state of electrical connection with the rear bracket by fastening a flange portion to a mounting pedestal of the rear bracket using a voltage regulator fixing second screw. A screw loosening restricting lug is disposed so as to project from a floor portion of a protective cover so as to face the voltage regulator fixing second screw so as to have a predetermined clearance in an axial direction.

3 Claims, 8 Drawing Sheets

AUTOMOTIVE ROTARY ELECTRIC MACHINE

BACKGROUND OF THE INVENTION

1. Field of the Invention

The present invention relates to an automotive rotary electric machine such as an automotive alternator, and particularly relates to a mechanism that prevents loosening of a screw that fastens a voltage regulator to a bracket.

2. Description of the Related Art

In conventional automotive alternators, a resin flange of a brush holder is fixed to a wall surface of a rear bracket by a screw. Connecting wiring is embedded in this flange, and the connecting wiring is electrically connected to the rear bracket by the fastening force from the screw (see Patent Literature 1, for example).

Patent Literature 1: Japanese Patent Laid-Open No. 2010-220477 (Gazette)

In conventional automotive alternators, because the connecting wiring is electrically connected to the rear bracket by the fastening force from the screw, one disadvantage has been that the screw may loosen due to vehicle vibration, and electrical contact failure may occur easily between the connecting wiring and the rear bracket. In particular, if a resin portion is mounted in the portion fastened by the screw, because the resin portion may displace due to creeping, weakening the fastening force of the screw, there has been an increased risk that the screw may rotate in the loosening direction due to vehicle vibration, and electrical contact failure may occur between the connecting wiring and the rear bracket.

SUMMARY OF THE INVENTION

The present invention aims to solve the above problems and an object of the present invention is to provide an automotive rotary electric machine that can restrict rotation of a screw in a loosening direction to suppress occurrences of contact failure in a portion that is electrically connected by fastening of the screw.

In order to achieve the above object, according to one aspect of the present invention, there is provided an automotive rotary electric machine including: a rotor that is rotatably supported inside a casing; a stator including: a stator core; and a stator winding that is mounted to the stator core, the stator being supported by the casing so as to surround the rotor; a rectifying apparatus including: a positive-side heatsink to which positive-side rectifying elements are mounted; a negative-side heatsink to which negative-side rectifying elements are mounted; and a circuit board that connects the positive-side rectifying elements and the negative-side rectifying elements so as to configure a bridge circuit, the rectifying apparatus being disposed outside a first axial end of the casing, and rectifying alternating-current electric power that is generated by the stator winding; a resin-molded body into which a voltage regulator positive electrode terminal and a voltage regulator negative electrode terminal are insert-molded so as to be exposed at respective first surfaces of first and second flange portions, the resin-molded body being disposed outside the first axial end of the casing; a voltage regulator that is attached to the resin-molded body so as to be electrically connected to the voltage regulator positive electrode terminal and the voltage regulator negative electrode terminal, the voltage regulator adjusting magnitude of an alternating-current voltage that is generated by the stator; and a resin protective cover that is prepared so as to have a cup shape that is constituted by a floor portion and a tubular peripheral wall portion, and that is mounted to the casing so as to cover the rectifying apparatus and the voltage regulator. The rectifying apparatus is mounted to the casing by fastening together the positive-side heatsink, the negative-side heatsink, and the circuit board on an outer end surface at the first axial end of the casing using a plurality of rectifying apparatus fixing screws such that the negative-side heatsink is in a state of electrical connection with the casing, and the resin-molded body is mounted to the casing by fastening together the first flange portion and the positive-side heatsink on the outer end surface of the first axial end of the casing using a voltage regulator fixing first screw so as to be electrically insulated such that the voltage regulator positive electrode terminal and the positive-side heatsink are in a state of electrical connection, and fastening the second flange portion to the outer end surface of the first axial end of the casing using a voltage regulator fixing second screw such that the voltage regulator negative electrode terminal is in a state of electrical connection with the casing. Screw loosening restricting lugs are respectively disposed so as to project from the floor portion of the protective cover so as to face the voltage regulator fixing first screw and the voltage regulator fixing second screw so as to have a predetermined clearance in an axial direction.

According to the present invention, because the voltage regulator fixing first screw and the voltage regulator fixing second screw contact the screw loosening restricting lugs if they rotate in a loosening direction due to vehicle vibration, etc., and further rotation is restricted, excessive increases in electrical contact resistance in the fastened portions of the voltage regulator fixing first screw and the voltage regulator fixing second screw are prevented, suppressing occurrences of contact failure.

DETAILED DESCRIPTION OF THE PREFERRED EMBODIMENTS

Preferred embodiments of the present invention will now be explained with reference to the drawings.

Embodiment 1

Figure 1:
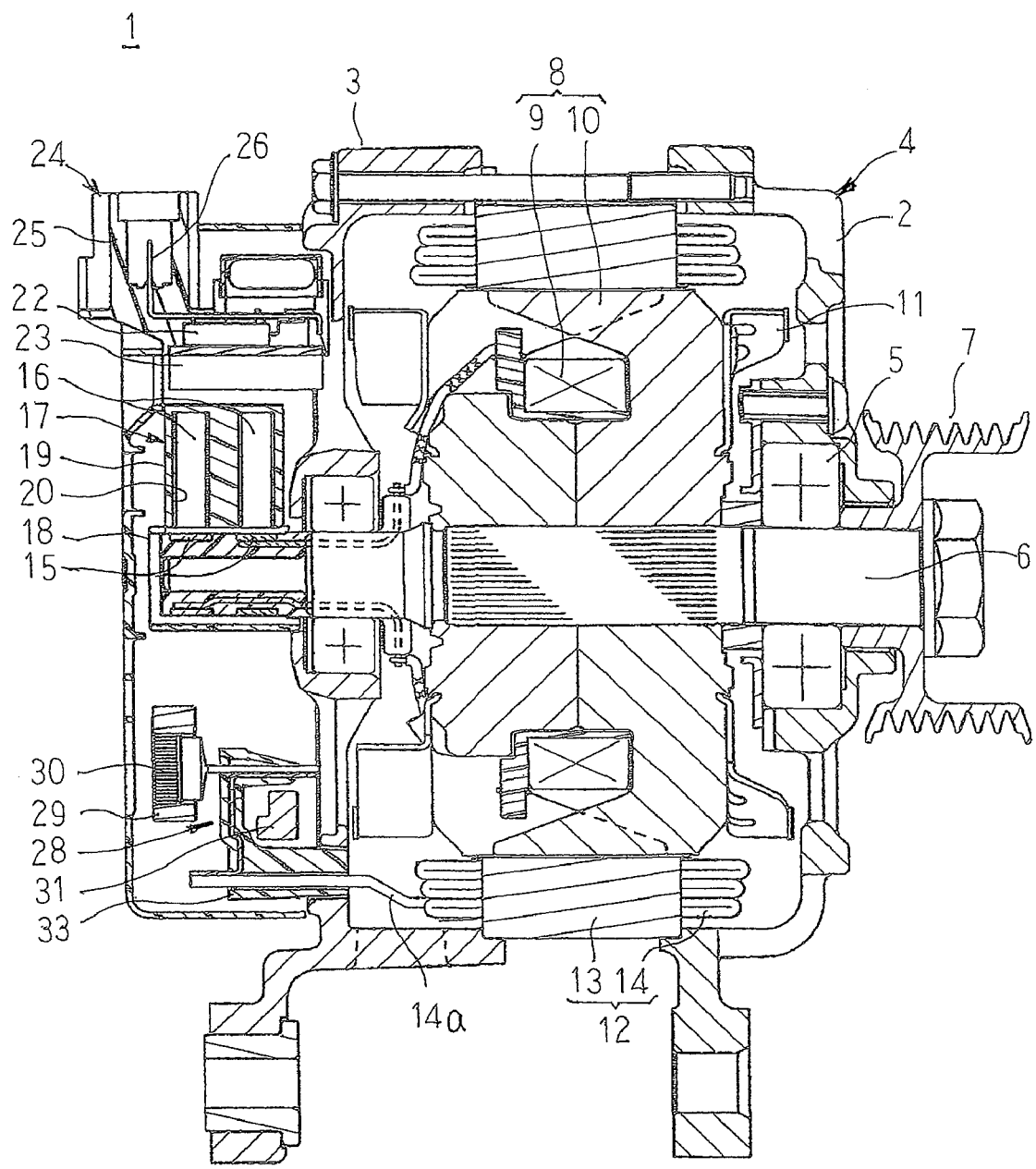
FIG. 1 is a longitudinal cross section that shows an automotive alternator according to Embodiment 1 of the present invention.
Figure 2:
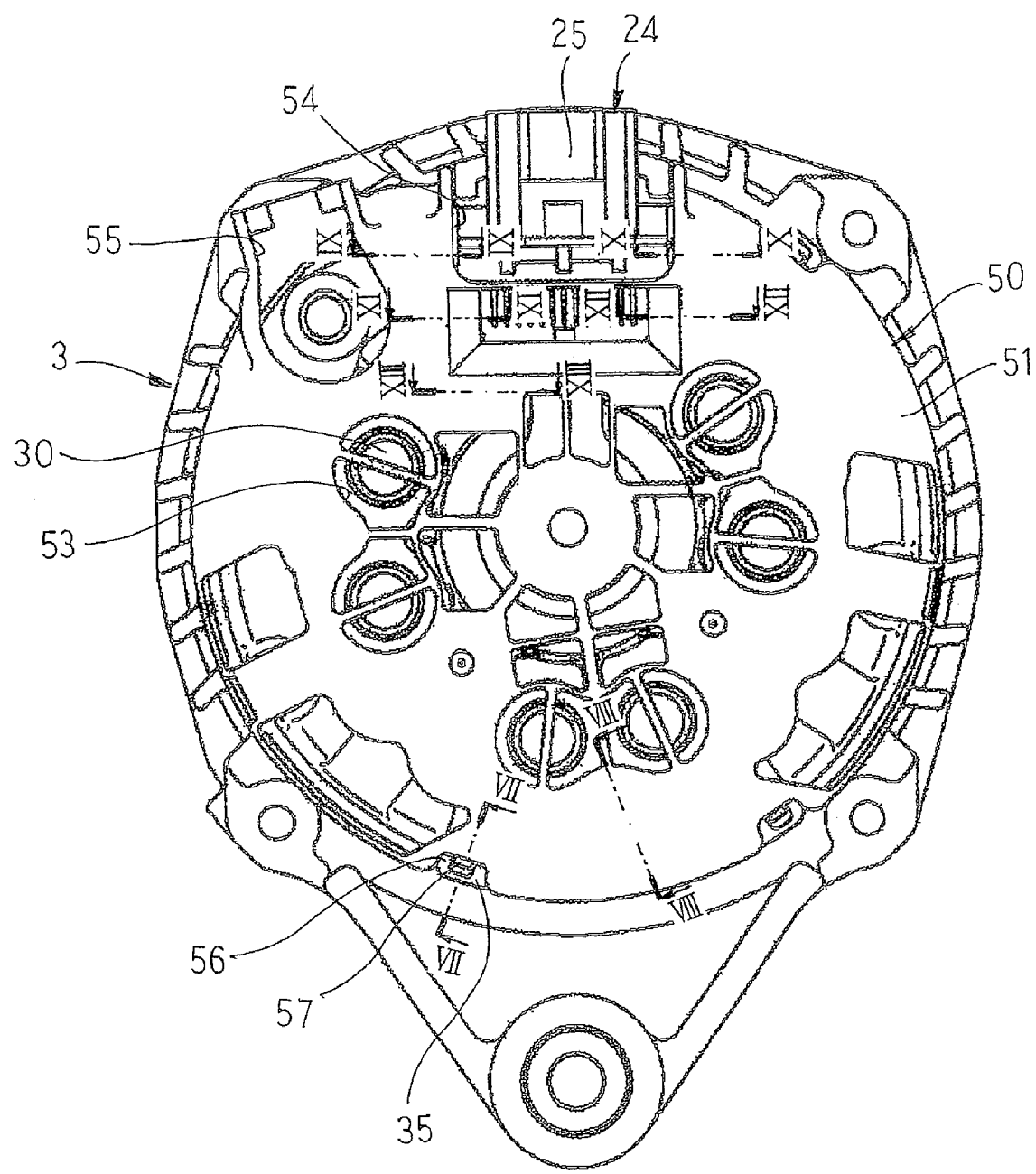
FIG. 2 is a rear-end end elevation that shows the automotive alternator according to Embodiment 1 of the present invention.
Figure 3:
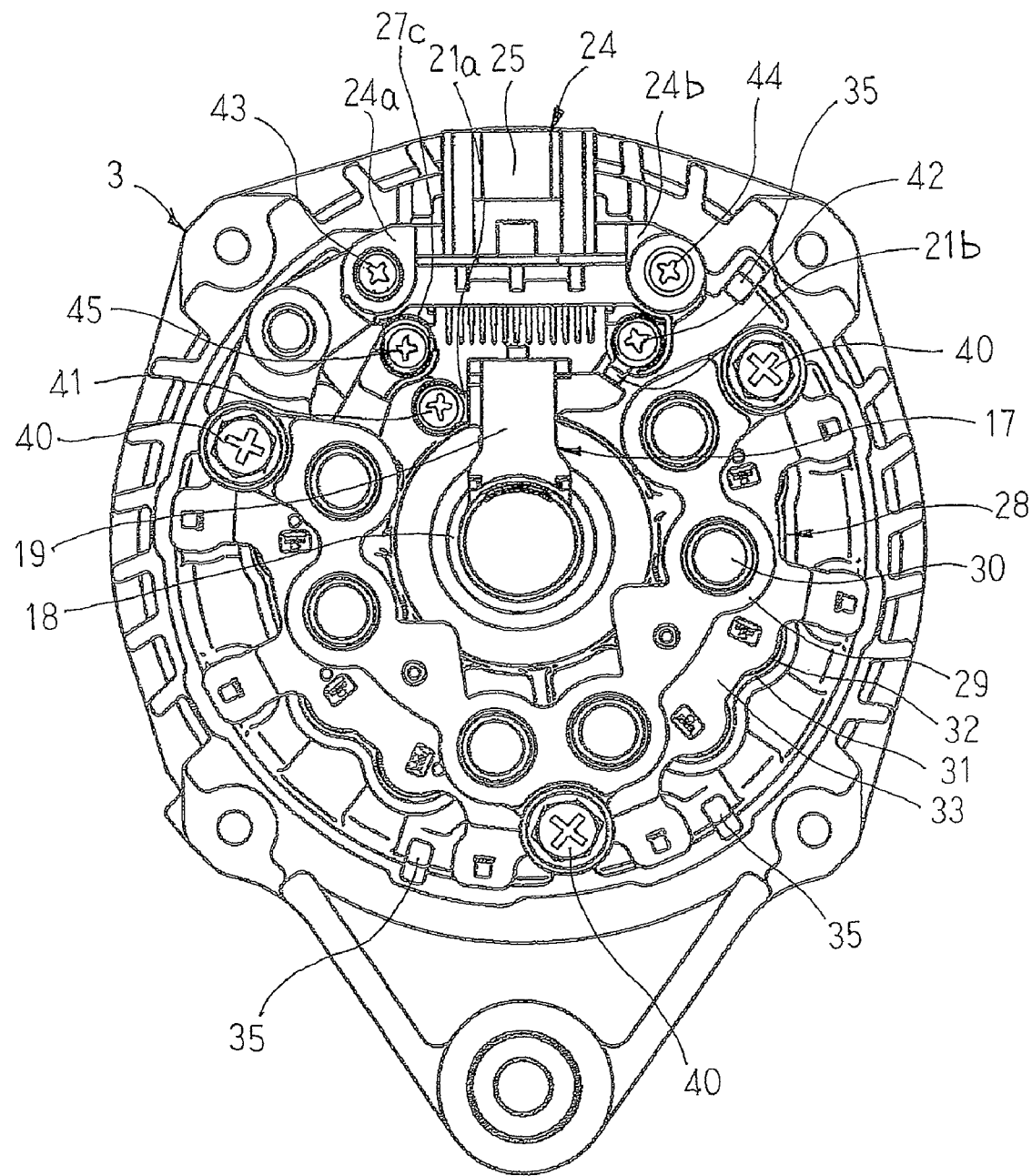
FIG. 3 is a rear-end end elevation that shows a state before mounting a protective cover in the automotive alternator according to Embodiment 1 of the present invention.
Figure 4:
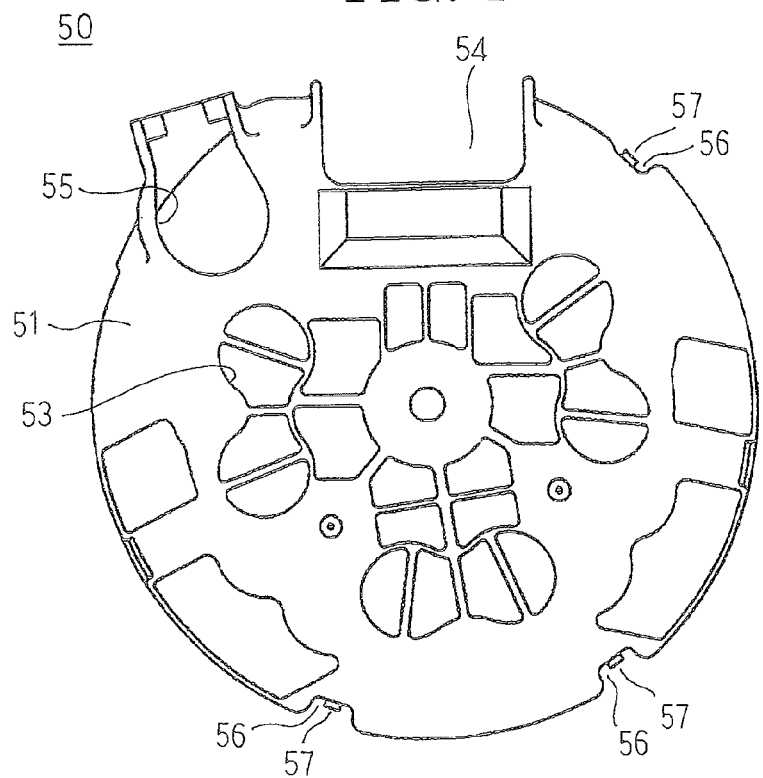
FIG. 4 is a front elevation that shows the protective cover in the automotive alternator according to Embodiment 1 of the present invention.
Figure 5:
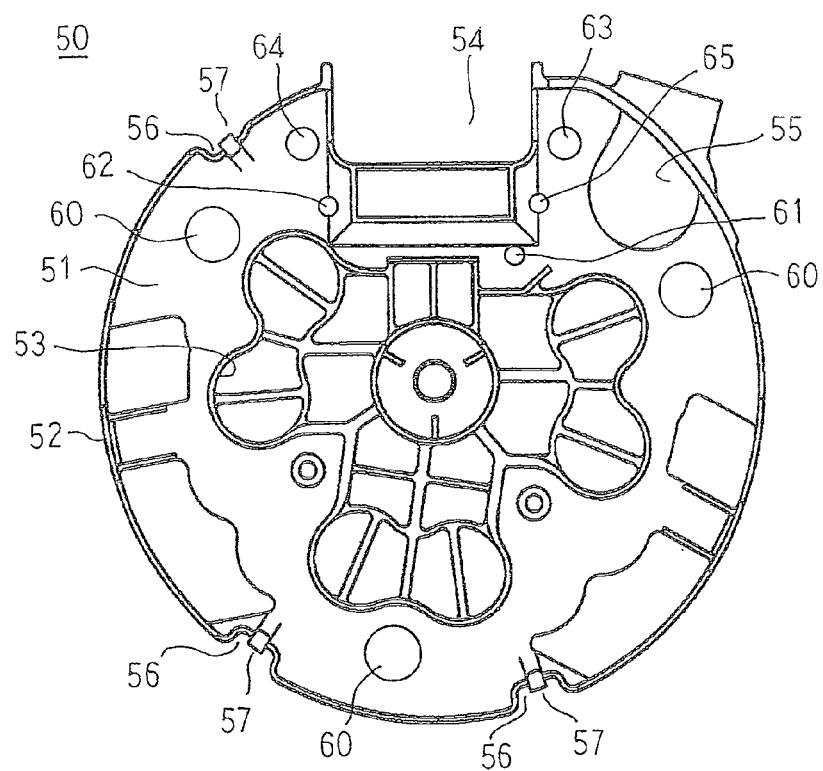
FIG. 5 is a rear elevation that shows the protective cover in the automotive alternator according to Embodiment 1 of the present invention.
Figure 6:
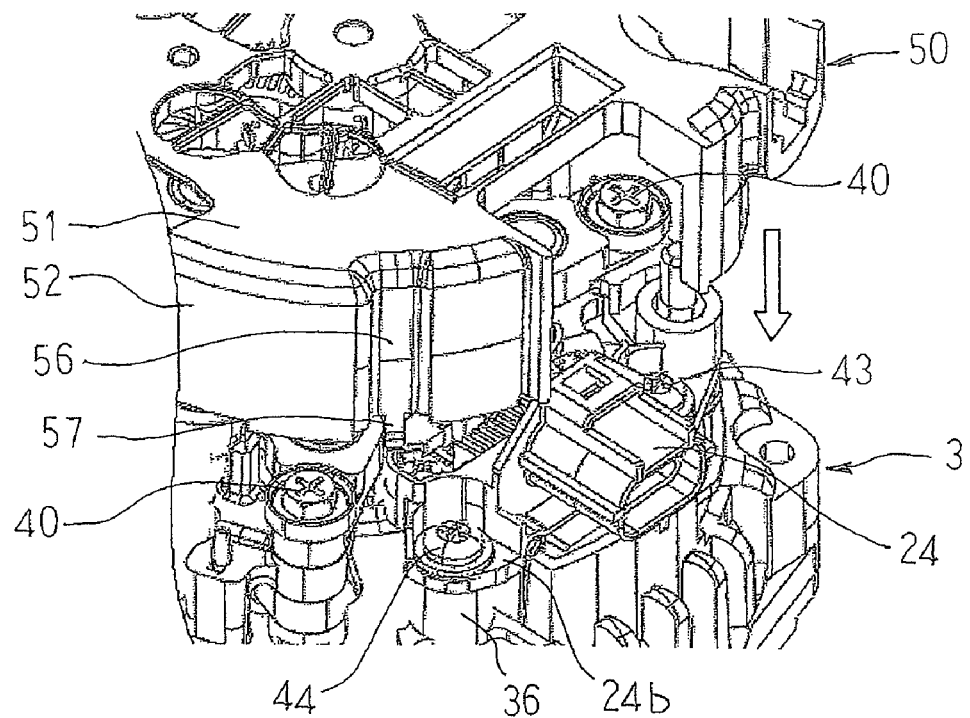
FIG. 6 is a partial perspective that explains a method for mounting the protective cover in the automotive alternator according to Embodiment 1 of the present invention.
Figure 7:
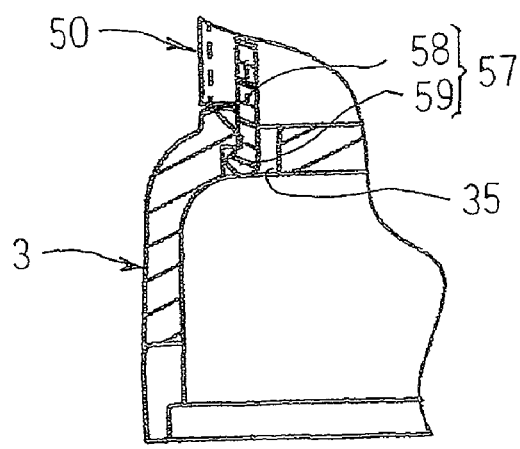
FIG. 7 is a cross section that is taken along Line VII-VII in FIG. 2 so as to be viewed in the direction of the arrows.
Figure 8:
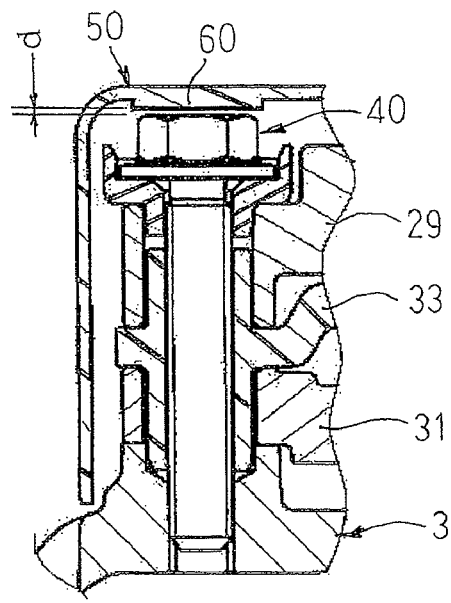
FIG. 8 is a cross section that is taken along Line VIII-VIII in FIG. 2 so as to be viewed in the direction of the arrows.
Figure 9:
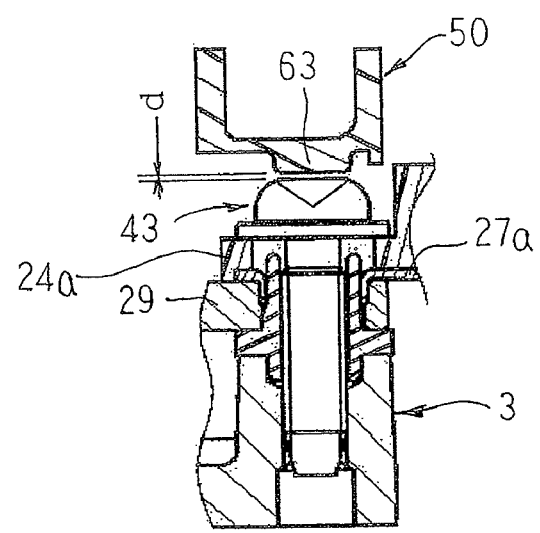
FIG. 9 is a cross section that is taken along Line IX-IX in FIG. 2 so as to be viewed in the direction of the arrows.
Figure 10:
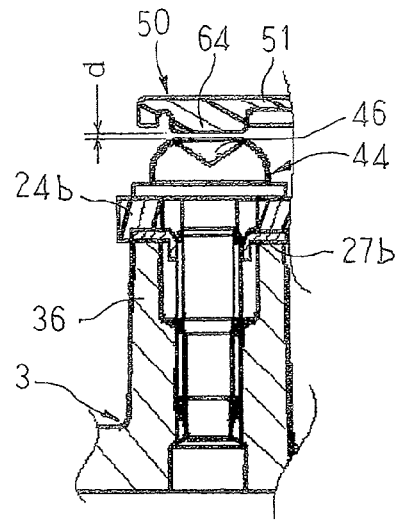
FIG. 10 is a cross section that is taken along Line X-X in FIG. 2 so as to be viewed in the direction of the arrows.
Figure 11:
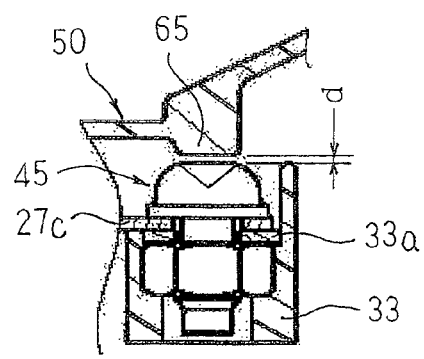
FIG. 11 is a cross section that is taken along Line XI-XI in FIG. 2 so as to be viewed in the direction of the arrows.
Figure 12:
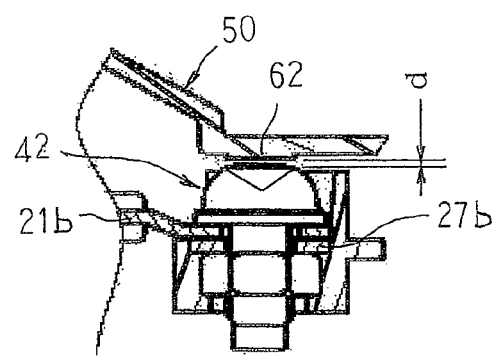
FIG. 12 is a cross section that is taken along Line XII-XII in FIG. 2 so as to be viewed in the direction of the arrows.
Figure 13:
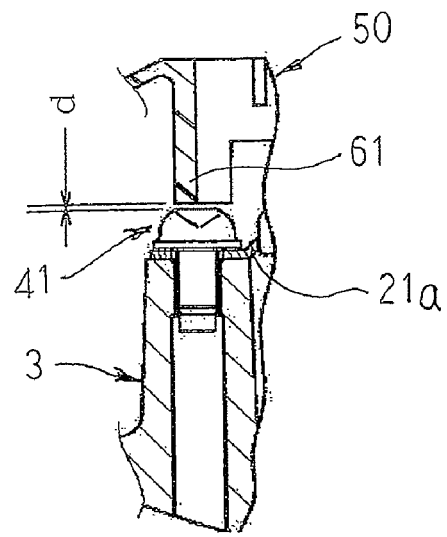
FIG. 13 is a cross section that is taken along Line XIII-XIII in FIG. 2 so as to be viewed in the direction of the arrows.

FIG. 1 is a longitudinal cross section that shows an automotive alternator according to Embodiment 1 of the present invention, FIG. 2 is a rear-end end elevation that shows the automotive alternator according to Embodiment 1 of the present invention, FIG. 3 is a rear-end end elevation that shows a state before mounting a protective cover in the automotive alternator according to Embodiment 1 of the present invention, FIG. 4 is a front elevation that shows the protective cover in the automotive alternator according to Embodiment 1 of the present invention, FIG. 5 is a rear elevation that shows the protective cover in the automotive alternator according to Embodiment 1 of the present invention, FIG. 6 is a partial perspective that explains a method for mounting the protective cover in the automotive alternator according to Embodiment 1 of the present invention, FIG. 7 is a cross section that is taken along Line VII-VII in FIG. 2 so as to be viewed in the direction of the arrows, FIG. 8 is a cross section that is taken along Line VIII-VIII in FIG. 2 so as to be viewed in the direction of the arrows, FIG. 9 is a cross section that is taken along Line IX-IX in FIG. 2 so as to be viewed in the direction of the arrows, FIG. 10 is a cross section that is taken along Line X-X in FIG. 2 so as to be viewed in the direction of the arrows, FIG. 11 is a cross section that is taken along Line XI-XI in FIG. 2 so as to be viewed in the direction of the arrows, FIG. 12 is a cross section that is taken along Line XII-XII in FIG. 2 so as to be viewed in the direction of the arrows, and FIG. 13 is a cross section that is taken along Line XIII-XIII in FIG. 2 so as to be viewed in the direction of the arrows.

In FIGS. 1 through 3, an automotive alternator 1 includes: a casing 4 that is constituted by a front bracket 2 and a rear bracket 3 that are each approximately bowl-shaped and made of aluminum; a shaft 6 that is rotatably supported in the casing 4 by means of a pair of bearings 5; a pulley 7 that is fixed to an end portion of the shaft 6 that projects out frontward from the casing 4; a rotor 8 that is fixed to the shaft 6 and that is disposed inside the casing 4; fans 11 that are fixed to two axial end surfaces of the rotor 8; a stator 12 that is fixed to the casing 4 so as to surround the rotor 8; a pair of slip rings 15 that are fixed to a portion of the shaft 6 that projects out rearward from the casing 4 and that supply electric current to the rotor 8; a pair of brushes 16 that slide on respective surfaces of the slip rings 15; a brush holder 17 that accommodates the brushes 16; a voltage regulator 22 that is disposed at a rear end of the rear bracket 3, and that adjusts magnitudes of alternating-current voltages that are generated in the stator 12; a connector 24 that is disposed at the rear end of the rear bracket 3, and that performs input and output of signals between the voltage regulator 22 and external devices (not shown); a rectifying apparatus 28 that is disposed at the rear end of the rear bracket 3, and that rectifies the alternating-current voltages that are generated in the stator 12 into a direct-current voltage; and a protective cover 50 that is mounted to the rear bracket 3 so as to cover the brush holder 17, the voltage regulator 22, and the rectifying apparatus 28.

The rotor 8 is a Lundell rotor, and includes: a field winding 9 that generates magnetic flux on passage of an excitation current; and a pole core 10 that is disposed so as to cover the field winding 9, and in which magnetic poles are formed by the magnetic flux. The stator 12 includes: a cylindrical stator core 13; and a stator winding 14 that is mounted into the stator core 13, and in which an alternating current is generated by changes in the magnetic flux from the field winding 9 that accompany rotation of the rotor 8. The stator 12 is disposed such that the stator core 13 is held between opening ends of the front bracket 2 and the rear bracket 3 from two axial ends so as to surround the rotor 8.

The brush holder 17 is prepared by molding an electrically insulating resin such as polybutylene terephthalate (PBT), is a resin-molded body into which electrical conductors are insert-molded, and has: an annular slinger portion 18; a holder portion 19 that is disposed so as to extend radially outward from the slinger portion 18; and brush insertion apertures 20 that are formed so as to pass radially through the slinger portion 18 and the holder portion 19. First ends of the electrical conductors that are insert-molded into the brush holder 17 each extend outward from the brush holder 17 to configure a brush negative electrode terminal 21a and a brush positive electrode terminal 21b. Second ends of the electrical conductors are respectively electrically connected to each of the pair of brushes 16 that are inserted into the brush insertion apertures 20.

The connector 24 is prepared by molding an electrically insulating resin such as PBT, and is a resin-molded body into which the electrical conductors have been insert-molded. Portions of the electrical conductors that project into the connector portion 25 constitute input/output terminals 26 for inputting and outputting signals. First ends of other electrical conductors are respectively exposed on lower surfaces of first and second flange portions 24a and 24b that are disposed so as to extend from two sides of the connector 24 to constitute a voltage regulator positive electrode terminal 27a and a voltage regulator negative electrode terminal 27b. A first end of another electrical conductor extends outward from the connector 24 to constitute a voltage regulator electrode terminal 27c for transmitting signals to and from the rectifying apparatus 28. In addition, a first end of another electrical conductor extends outward from the connector 24 to constitute a voltage regulator brush connecting terminal 27d that is connected to the brush positive electrode terminal 21b. The voltage regulator 22 is electrically connected to second ends of the electrical conductors that constitute the input/output terminal 26, the voltage regulator positive electrode terminal 27a, the voltage regulator negative electrode terminal 27b, the voltage regulator electrode terminal 27c, and the voltage regulator brush connecting terminal 27d, and is held by fitting a heatsink 23 over the connector 24.

The rectifying apparatus 28 includes: a positive-side heatsink 29 to which a plurality of positive-side rectifying elements 30 are mounted; a negative-side heatsink 31 to which a plurality of negative-side rectifying elements 32 are mounted; and a circuit board 33, and is configured into an approximate C shape such that the circuit board 33 is sandwiched between the positive-side heatsink 29 and the negative-side heatsink 31. The circuit board 33 is made by molding an electrically insulating resin such as PBT. The positive-side rectifying elements 30 and the negative-side rectifying elements 32 are connected so as to configure a predetermined bridge circuit by means of the electrical conductors that are insert-molded into the circuit board 33.

A construction for mounting the brush holder 17, the connector 24, and the rectifying apparatus 28 will now be explained.

The rectifying apparatus 28 is disposed outside the slip rings 15 in a fan shape that is centered around the shaft 6 in a plane that is perpendicular to the shaft 6 such that the negative-side heatsink 31 faces toward the rear bracket 3. As shown in FIG. 8, the rectifying apparatus 28 is mounted to the rear bracket 3 by fixing the positive-side heatsink 29, the negative-side heatsink 31, and the circuit board 33 together onto an outer end surface of the rear bracket 3 by fastening at three positions that are spaced apart circumferentially using rectifying apparatus fixing screws 40. Here, the positive-side heatsink 29 is electrically insulated from the negative-side heatsink 31 and the rectifying apparatus fixing screws 40, and the negative-side heatsink 31 is electrically connected to the rear bracket 3 by fastening forces from the rectifying apparatus fixing screws 40. In addition, lead wires 14*a* of the stator winding 14 are led out through the rear bracket 3 and are connected to electrode terminals of the circuit board 33 to electrically connect the rectifying apparatus 28 and the stator winding 14.

The brush holder 17 is disposed axially outside the rear bracket 3 such that the holder portion 19 is positioned between tip ends of the approximate C shape of the rectifying apparatus 28, and the slinger portion 18 is mounted to the shaft 6 so as to surround the slip rings 15. As shown in FIGS. 12 and 13, the brush holder 17 is mounted to the rear bracket 3 such that the brush negative electrode terminal 21*a* is fastened to an outer end surface of the rear bracket 3 by first and second brush holder fixing screws 41 and 42, and the brush positive electrode terminal 21*b* is fastened together with the voltage regulator brush connecting terminal 27*d*. At that point, the brush negative electrode terminal 21*a* is electrically connected to the rear bracket 3.

The connector 24 is disposed axially outside the rear bracket 3 so as to be positioned between the tip ends of the approximate C shape of the rectifying apparatus 28 such that the heatsink 23 is oriented toward the brush holder 17. As shown in FIG. 9, the first flange portion 24*a* is disposed such that the voltage regulator positive electrode terminal 27*a* that is exposed on the lower surface thereof is stacked so as to face an end portion of the positive-side heatsink 29, and is fastened together with the positive-side heatsink 29 on the outer end surface of the rear bracket 3 by a voltage regulator fixing first screw 43 so as to be electrically insulated. As shown in FIG. 10, the second flange portion 24*b* is stacked such that the voltage regulator negative electrode terminal 27*b* that is exposed on the lower surface thereof faces the outer end surface of the rear bracket 3, and is fastened to the outer end surface of the rear bracket 3 by a voltage regulator fixing second screw 44. In addition, as shown in FIG. 11, the voltage regulator electrode terminal 27*c* is stacked on the signal wiring 33*a* of the circuit board 33 and is fastened by a voltage regulator fixing third screw 45. The connector 24 is thereby mounted to the rear bracket 3.

Here, the voltage regulator positive electrode terminal 27*a* is electrically insulated from the rear bracket 3 and the voltage regulator fixing first screw 43, and is electrically connected to the positive-side heatsink 29 by the fastening force from the voltage regulator fixing first screw 43. The voltage regulator negative electrode terminal 27*b* is electrically connected to the rear bracket 3 by the fastening force from the voltage regulator fixing second screw 44. In addition, the voltage regulator electrode terminal 27*c* is electrically connected to the signal wiring 33*a* of the circuit board 33 by the fastening force from the voltage regulator fixing third screw 45.

Next, a configuration of the protective cover 50 will be explained with reference to FIGS. 4 and 5.

The protective cover 50 is molded in a floored cylindrical shape that is constituted by a floor portion 51 and a cylindrical peripheral wall portion 52 using an electrically insulating resin such as PBT or nylon 66. A plurality of air intake apertures 53 are formed on the floor portion 51.

A connector outlet aperture 54 is formed by cutting away a portion of the floor portion 51 of the protective cover 50 and the peripheral wall portion 52. An output terminal take-off aperture 55 is formed on the protective cover 50 on one circumferential side of the connector outlet aperture 54. In addition, three recess portions 56 are each formed so as to extend continuously from an opening end of the peripheral wall portion 52 to the floor portion 51 by hollowing out a portion of the peripheral wall portion 52 radially inward.

Engaging hooks 57 are constituted by: shank portions 58 that are disposed so as to extend in groove directions of the recess portions 56 from the opening end of the peripheral wall portion 52 at circumferentially central positions of each of the recess portions 56; and hook portions 59 that are disposed so as to project radially outward from the peripheral wall portion 52 from tip ends of the shank portions 58.

First through sixth screw loosening restricting lugs 60 through 65 are disposed so as to project from the inner wall surfaces of the floor portion 51 so as to face positions at which the screws 40 through 45, respectively, are fastened.

Moreover, engaging apertures 35 are formed on an outer circumferential edge portion of the rear bracket 3 so as to correspond to each of the engaging hooks 57.

In contrast to the casing 4 that bears support of the rotor 8 and installation and support of the automotive alternator 1 on the engine, because this resin protective cover 50 assumes a function of protecting parts such as the voltage regulator 22 and the rectifying apparatus 28, etc., which are disposed outside the casing 4, from exposure to moisture and adhesion of foreign matter, it does not require high rigidity, and is formed so as to have a thickness that enables elastic deformation.

The protective cover 50 is mounted to the rear bracket 3, as shown in FIG. 6, such that the opening end is oriented toward the rear bracket 3 and the engaging hooks 57 are matched up with the engaging apertures 35. Then, as shown in FIG. 7, the engaging hooks 57 are inserted into the engaging apertures 35, and the engaging hooks 57 and the engaging apertures 35 are coupled by snap-fitting to hold the protective cover 50 on the rear bracket 3.

In an automotive alternator 1 that is configured in this manner, the air intake apertures 53 face the heatsink 23 of the voltage regulator 22, and the positive-side rectifying elements 30 of the rectifying apparatus 28, etc. Then, the fans 11 are driven to rotate together with the rotor 8 when the automotive alternator 1 is operating, and external air is sucked inside the protective cover 50 through the air intake apertures 53 to cool the voltage regulator 22 and the positive-side rectifying elements 30 of the rectifying apparatus 28 effectively.

Here, as shown in FIG. 10, the second flange portion 24*b* of the connector 24 is mounted by being placed such that the voltage regulator negative electrode terminal 27*b* that is exposed on the lower surface thereof faces a mounting pedestal 36 that is disposed so as to protrude from an external wall surface of the rear bracket 3, and fastening the voltage regulator fixing second screw 44 into the mounting pedestal 36. Thus, the fifth screw loosening restricting lug 64 that is disposed so as to protrude from the floor portion 51 of the protective cover 50 that is mounted to the rear bracket 3 faces the voltage regulator fixing second screw 44 axially so as to have a predetermined clearance d. Then, even if the fastening force of the voltage regulator fixing second screw 44 loosens due to vehicle vibration, or loosens due to creeping of the resin flange portion, and the voltage regulator fixing second screw 44 starts to rotate in a direction in which the fastening force weakens, the head portion of the voltage regulator fixing second screw 44 contacts the fifth screw loosening restricting lug 64, preventing further rotation of the voltage regulator fixing second screw 44.

Because the first through fourth screw loosening restricting lugs 60 through 63, and the sixth screw loosening restricting lug 65 similarly face the respective screws 40 through 43, and 45 so as to have a predetermined clearance d, as shown in FIGS. 8 and 9, and 11 through 13, even if the screws 40 through 43, and 45 rotate in a direction in which their fastening forces are weakened, the head portions of the screws 40 through 43, and 45 contact the screw loosening restricting lugs 60 through 63, and 65, preventing further rotation of the screws 40 through 43, and 45.

First, because large spaces cannot be ensured in the layout of the fastened portion of the voltage regulator positive electrode terminal 27a and the fastened portion of the voltage regulator negative electrode terminal 27b, large-diameter screws cannot be used for the voltage regulator fixing first and second screws 43 and 44, and increases in fastening force cannot be expected from the voltage regulator fixing first and second screws 43 and 44. In addition, because the flange portions 24a and 24b are interposed between the fastened portions in question, there is a risk that deformation may occur over a long period of time due to creeping of the flange portions 24a and 24b. However, according to Embodiment 1, because the fourth and fifth screw loosening restricting lugs 63 and 64 are disposed so as to project from the inner wall surfaces of the floor portion 51 of the protective cover 50 so as to face the head portions of the voltage regulator fixing first and second screws 43 and 44 so as to have a predetermined clearance d, even if the voltage regulator fixing first and second screws 43 and 44 rotate in a loosening direction due to vehicle vibration or due to creeping of the first and second flange portions 24a and 24b, the head portions of the voltage regulator fixing first and second screws 43 and 44 will contact the fourth and fifth screw loosening restricting lugs 63 and 64, preventing further rotation. As a result, predetermined fastening forces are ensured from the voltage regulator fixing first and second screws 43 and 44, avoiding excessive increases in electrical resistance in the electrical connection portions in question, and suppressing occurrences of contact failure.

Because the resin portion is interposed between the rear bracket 3 and the portion of the rectifying apparatus 28 that is fastened to the rear bracket 3, there is a risk that deformation due to creeping of the resin portion may occur over a long period of time. According to Embodiment 1, because the first screw loosening restricting lugs 60 are disposed so as to project from the inner wall surface of the floor portion 51 of the protective cover 50 so as to face the head portions of the rectifying apparatus fixing screws 40 so as to have a predetermined clearance d, even if the rectifying apparatus fixing screws 40 do happen to rotate in the loosening direction due to creeping of the resin portion, because the head portions of the rectifying apparatus fixing screws 40 contact the first screw loosening restricting lugs 60, preventing further rotation, predetermined fastening forces are ensured from the rectifying apparatus fixing screws 40, enabling occurrences of contact failure to be reliably suppressed.

Because large spaces cannot be ensured in the layout of the coupled portion of the brush positive electrode terminal 21b and the fastened portion of the voltage regulator electrode terminal 27c, large-diameter screws cannot be used for the second brush holder fixing screw 42 and the voltage regulator fixing third screw 45, and increases in fastening force cannot be expected from the second brush holder fixing screw 42 and the voltage regulator fixing third screw 45. However, according to Embodiment 1, because the third and sixth screw loosening restricting lugs 62 and 65 are disposed so as to project from the inner wall surfaces of the floor portion 51 of the protective cover 50 so as to face the head portions of the second brush holder fixing screw 42 and the voltage regulator fixing third screw 45 so as to have a predetermined clearance d, even if the second brush holder fixing screw 42 and the voltage regulator fixing third screw 45 rotate in a loosening direction due to vehicle vibration or due to creeping of the resin portion, the head portions of the second brush holder fixing screw 42 and the voltage regulator fixing third screw 45 contact the third and sixth screw loosening restricting lugs 62 and 65, preventing further rotation. As a result, predetermined fastening forces are ensured from the second brush holder fixing screw 42 and the voltage regulator fixing third screw 45, avoiding excessive increases in electrical resistance in the electrical connection portions in question, and suppressing occurrences of contact failure.

Although a resin portion is not interposed in the fastened portion in question, because a large space cannot be ensured in the layout of the coupled portion of the brush negative electrode terminal 21a, a large-diameter screw cannot be used for the first brush holder fixing screw 41, and loosening of the first brush holder fixing screw 41 cannot be suppressed over a long period of time. However, according to Embodiment 1, because the second screw loosening restricting lug 61 is disposed so as to project from the inner wall surface of the floor portion 51 of the protective cover 50 so as to face the head portion of the first brush holder fixing screw 41 so as to have a predetermined clearance d, even if the first brush holder fixing screw 41 rotates in a loosening direction due to vehicle vibration or due to creeping of the resin portion, the head portion of the first brush holder fixing screw 41 contacts the second screw loosening restricting lug 61, preventing further rotation. As a result, predetermined fastening forces are ensured from the first brush holder fixing screw 41, avoiding excessive increases in electrical resistance in the electrical connection portion in question, and suppressing occurrences of contact failure.

Here, from the viewpoint of suppressing excessive increases in electrical resistance at the electrical connection portions that result from decreases in fastening force due to rotation of the screws 40 through 45, it is preferable for the clearance d to be set to less than or equal to half a pitch of the screws 40 through 45.

The first screw loosening restricting lugs 60 are disposed so as to face each of the three rectifying apparatus fixing screws 40, but it is not absolutely necessary to dispose the first screw loosening restricting lugs 60 so as to face each of the three rectifying apparatus fixing screws 40 provided that at least one is disposed so as to face a rectifying apparatus fixing screw 40. In that case, preparation of the protective cover 50 is facilitated, and positioning between the first screw loosening restricting lug 60 and the rectifying apparatus fixing screw 40 is also facilitated, enabling costs to be reduced.

Embodiment 2

Figure 14:
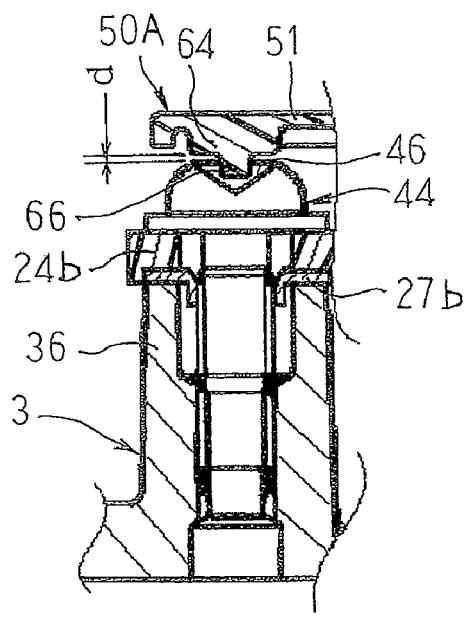
FIG. 14 is a partial cross section that shows a mounted state of a protective cover in an automotive alternator according to Embodiment 2 of the present invention.

FIG. 14 is a rear-end end elevation that shows a mounted state of a protective cover in an automotive alternator according to Embodiment 2 of the present invention.

In FIG. 14, a salient portion 66 is disposed so as to project centrally from an apex portion of a fifth screw loosening restricting lug 64. The salient portion 66 is configured so as to be inserted into a cross recess 46 that is formed on an apex portion of a head portion of a voltage regulator fixing second screw 44 when a protective cover 50A is mounted to a rear bracket 3.

Salient portions 66 are also disposed so as to project centrally from apex portions of first through fourth, and sixth screw loosening restricting lugs 60 through 63, and 65 and are configured so as to be inserted into cross recesses 46 that are formed on apex portions of the head portions of rectifying apparatus fixing screws 40, a second brush holder fixing screw 42, voltage regulator fixing first and second screws 43 and 44, and a voltage regulator fixing third screw 45, but because effects thereof are similar to those of the salient portion 66 being disposed so as to project centrally from the apex portion of the screw loosening restricting lug 64, explanation thereof will be omitted here.

Moreover, the rest of the configuration is configured in a similar manner to Embodiment 1 above.

In Embodiment 2, the salient portion 66 is inserted into the cross recess 46 that is formed on the apex portion of the head portion of the voltage regulator fixing second screw 44. The cross recess 46 has a recess shape that is constituted by a circular recess, and grooves that extend radially in a cross shape from the circular recess. Thus, if the voltage regulator fixing second screw 44 rotates in the loosening direction, a wall surface of the grooves of the cross recess 46 near the circular recess is caught on the salient portion 66 before the voltage regulator fixing second screw 44 contacts the apex portion of the screw loosening restricting lug 64, preventing further rotation.

Consequently, according to Embodiment 2, rotation of the voltage regulator fixing second screw 44 is reliably restricted by engagement between the wall surface of the cross recess 46 and the salient portion 66 in the initial stages of rotation, enabling occurrences of contact failure at the electrical connection portions between the voltage regulator negative electrode terminal 27b and the rear bracket 3 to be reliably prevented.

The amount of rotation from the start of rotation of the voltage regulator fixing second screw 44 until rotation is restricted is less than in Embodiment 1 above, enabling electrical resistance at the electrical connection portion between the voltage regulator negative electrode terminal 27b and the rear bracket 3 to be maintained at low resistance over a long period of time.

Here, considering engagement with the wall surface of the grooves of the cross recess 46 near the circular recess, it is desirable for the salient portions 66 to have a cross-sectional shape that has corners such as a triangle, a quadrilateral, etc.

Moreover, in each of the above embodiments, explanation is given for an automotive alternator, but the present invention is not limited to automotive alternators, and similar effects are also exhibited if the present invention is applied to automotive dynamoelectric machines such as automotive electric motors, or automotive generator-motors.

In each of the above embodiments, the brush holder and the connector are made into separate resin-molded bodies, but the brush holder and the connector may also be made into an integrated resin-molded body.

What is claimed is:

1. An automotive rotary electric machine comprising:
    a rotor that is rotatably supported inside a casing;
    a stator comprising:
       a stator core; and
       a stator winding that is mounted to said stator core, said stator being supported by said casing so as to surround said rotor;
    a rectifying apparatus comprising:
       a positive-side heatsink to which positive-side rectifying elements are mounted;
       a negative-side heatsink to which negative-side rectifying elements are mounted; and
       a circuit board that connects said positive-side rectifying elements and said negative-side rectifying elements so as to configure a bridge circuit,
    said rectifying apparatus being disposed outside a first axial end of said casing, and rectifying alternating-current electric power that is generated by said stator winding;
    a resin-molded body into which a voltage regulator positive electrode terminal and a voltage regulator negative electrode terminal are insert-molded so as to be exposed at respective first surfaces of first and second flange portions, said resin-molded body being disposed outside said first axial end of said casing;
    a voltage regulator that is attached to said resin-molded body so as to be electrically connected to said voltage regulator positive electrode terminal and said voltage regulator negative electrode terminal, said voltage regulator adjusting magnitude of an alternating-current voltage that is generated by said stator; and
    a resin protective cover that is prepared so as to have a cup shape that is constituted by a floor portion and a tubular peripheral wall portion, and that is mounted to said casing so as to cover said rectifying apparatus and said voltage regulator,
    wherein said rectifying apparatus is mounted to said casing by fastening together said positive-side heatsink, said negative-side heatsink, and said circuit board on an outer end surface at said first axial end of said casing using a plurality of rectifying apparatus fixing screws such that said negative-side heatsink is in a state of electrical connection with said casing;
    wherein said resin-molded body is mounted to said casing by fastening together said first flange portion and said positive-side heatsink on said outer end surface of said first axial end of said casing using a voltage regulator fixing first screw so as to be electrically insulated such that said voltage regulator positive electrode terminal and said positive-side heatsink are in a state of electrical connection, and fastening said second flange portion to said outer end surface of said first axial end of said casing using a voltage regulator fixing second screw such that said voltage regulator negative electrode terminal is in a state of electrical connection with said casing; and
    wherein screw loosening restricting lugs are respectively disposed so as to project from said floor portion of said protective cover so as to face said voltage regulator fixing first screw and said voltage regulator fixing second screw so as to have a predetermined clearance in an axial direction.

2. An automotive rotary electric machine according to claim 1, wherein said screw loosening restricting lugs are further disposed so as to project from said floor portion of said protective cover so as to face at least one of said plurality of rectifying apparatus fixing screws so as to have a predetermined clearance in said axial direction.

3. An automotive rotary electric machine according to claim 1, wherein a salient portion is disposed so as to project centrally from a top portion of said screw loosening restricting lugs, and said salient portion is inserted into a recess that is formed on an apex portion of a head portion of a facing screw.

* * * * *